April 17, 1962 M. E. HARDY ET AL 3,030,115

TONE ARM POSITIONING ASSEMBLY

Filed Dec. 23, 1960 2 Sheets-Sheet 1

INVENTORS
Maurice E. Hardy
Werner H. Puls
BY Francis W. Crotty
ATTORNEY

April 17, 1962 M. E. HARDY ET AL 3,030,115

TONE ARM POSITIONING ASSEMBLY

Filed Dec. 23, 1960 2 Sheets-Sheet 2

INVENTORS
Maurice E. Hardy
Werner H. Puls
BY Francis W. Crotty
ATTORNEY

United States Patent Office 3,030,115

Patented Apr. 17, 1962

3,030,115

TONE ARM POSITIONING ASSEMBLY

Maurice E. Hardy, Evanston, and Werner H. Puls, Northbrook, Ill, assignors to Zenith Radio Corporation, a corporation of Delaware Filed Dec. 23, 1960, Ser. No. 78,023
6 Claims. (Cl. 274—10)

This invention relates, in general, to automatic record changers adapted to play in sequence each of a stack of record discs, and pertains more particularly to an improved assembly for positioning the tone arm of the record changer on the commencement groove of records of varying sizes.

To position a tone arm properly there must be some type of sensing device to sense the size of the record to be played and then transfer this information to a tone arm locating member. Some prior art arrangements utilize the intelligence of the user in having him manually set in the record size information on the record changer. This is objectionable since the user must adjust the changer each time a different size record is to be played. Other systems use buttons or levers which are displaced by contact with the record as it drops to adjust to the size of the record. A disadvantage of these systems is the usually complicated and costly mechanical linkages involved.

A further arrangement utilizes a sensing arm which moves laterally over the turntable to engage the periphery of the record to be played and then transfers this information to a tone arm locating member. An inherent difficulty in this type of arrangement is the necessity of having some means for driving the sensing arm from its reference or rest position to engagement with the periphery of records of several different sizes. For example the travel of the sensing arm to engage the periphery of a large size record is relatively small and yet the same driving means must be able to displace the sensing arm a much greater amount in order to sense the smallest size record to be played. In the present state of the prior art, almost all drives of this type utilize some kind of friction clutch or spring relief mechanism to allow the sensing arm to stop upon engaging a record while at the same time permitting the driving means to continue to operate. Such slip-drive arrangements are expensive, complicated and unreliable in operation.

It is an object of this invention, therefore, to provide an improved automatic record changer having a tone arm positioning assembly which is less costly to produce than prior arrangements but yet is more efficient and reliable in its operation.

It is a further object of this invention to provide a tone arm positioning assembly which employs a minimum number of parts as compared to the complicated linkages characteristic of prior art arrangements.

In accordance with the invention, a tone arm positioning assembly for an automatic record changer having a record changing mechanism for effectuating a record change cycle comprises a sensing arm having a reference position and movable during a record change cycle from such position to engage the periphery of a record to be played by the record changer. A tone arm locating member is provided and is movable with the sensing arm. Finally, there are means for driving the sensing arm from the record changing mechanism including a coupling device that establishes a releasable driving connection between the sensing arm and the record changing mechanism which connection is interrupted when movement of the sensing arm is arrested by engagement of the arm with a record during a record change cycle.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figure 1:
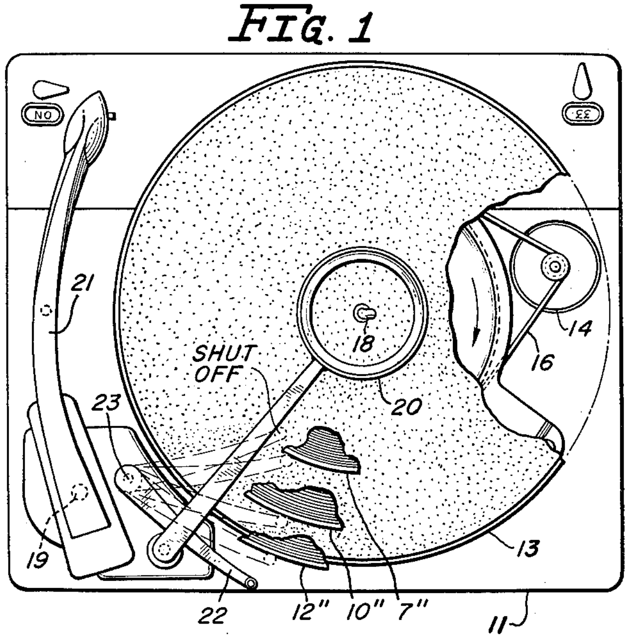
FIGURE 1 is a plan view of an automatic record changer embodying the invention.

Referring now to FIGURE 1, the automatic record changer there represented includes a mounting base 11 upon which a turntable 13 is supported for rotation and driven by a driving wheel 14 which is coupled to turntable 13 by a belt 16. Wheel 14 has a motor drive which has been omitted from the drawing. The record changer further includes a center spindle 18 with an offset upon which records to be played are stacked, the records being held in a horizontal position by a leverler arm 20 which is attached to mounting base 11. A tone arm 21 is rotatably mounted on a tone arm shaft 19 to mounting base 11 and is adapted to engage the grooves of a record to be played in a manner well known in the art. A sensing arm 22 is mounted on the base by a shaft 23 and is shown in its reference position abutting the support for leveler arm 20. Dashed outlines are shown of sensing arm 22 engaging the peripheries of a 12 inch record, a 10 inch record and a 7 inch record. The sensing arm also has a "shut-off" position to which it is moved during the record-change cycle following the play of the last record on the stack.

The following steps are usually involved in a record change cycle: (1) When the tone arm tracks to the end of a record, it initiates a cycle of the record changing mechanism which raises the tone arm to disengage its stylus from the played record. (2) The tone arm is moved outwardly to a position clear of the path of movement of a record traveling from the stack to the playing position on a turntable. (3) A record is released from this stack onto the turntable. (4) While the record is being released from the stack or just before its release, the sensing device is actuated to determine the size of the record; in the present embodiment this is sensing arm 22 shown in FIGURE 1. (5) The tone arm is moved back over the edge of the record to be played and then is lowered on the commencement groove of the record. The change cycle is now completed.

Figure 2:
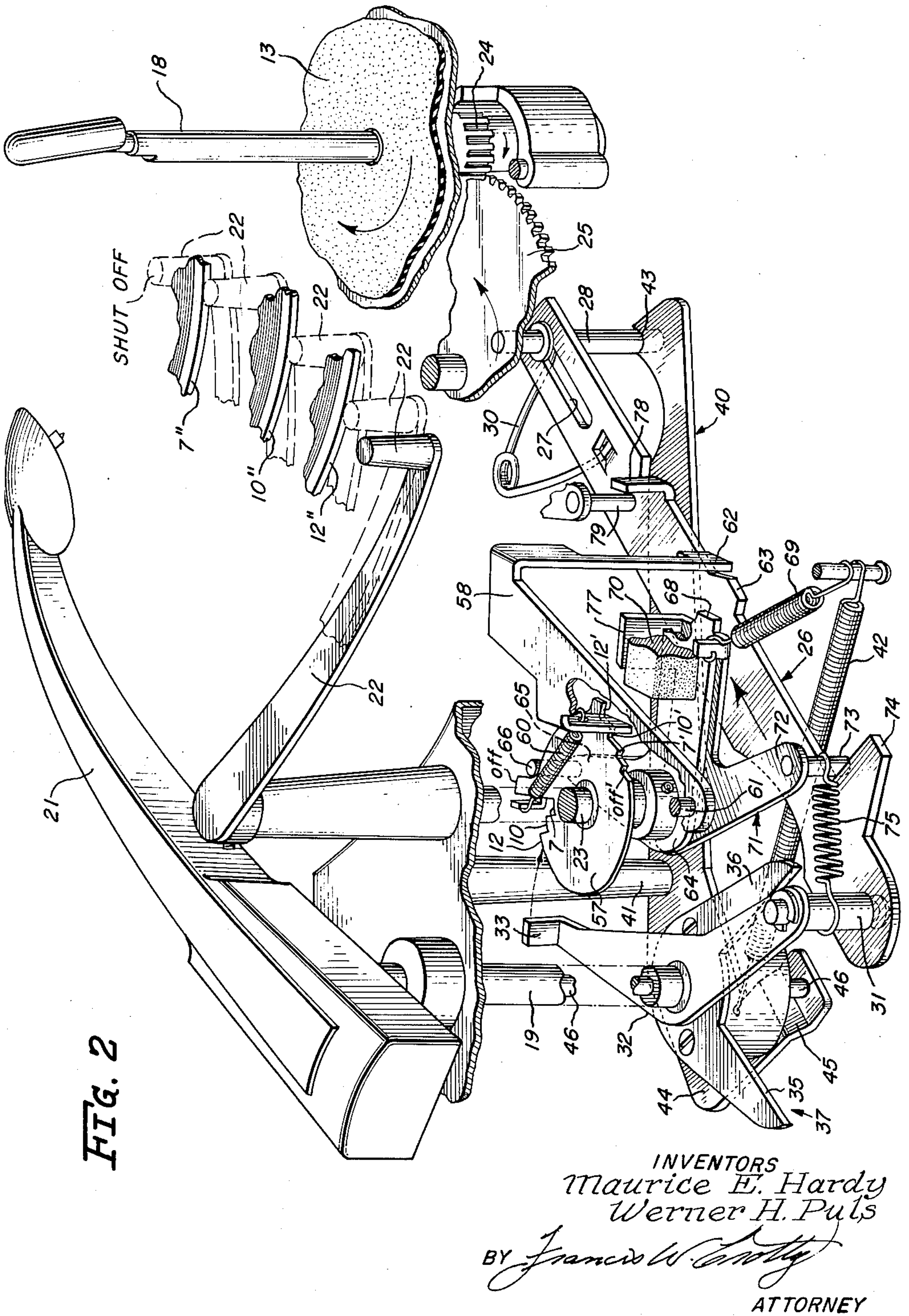
FIGURE 2 is an expanded perspective view of the tone arm positioning assembly and a part of the record changing mechanism of the automatic record changer.

The change-cycle mechanism for raising and lowering the tone arm, moving it laterally over the turntable, and releasing the records from the stack is old in the art and will be discussed briefly. Referring to FIGURE 2, a gear 24 is affixed to turntable 13 and rotates freely within the multilated section of a main gear 25 during the play of a record. However, at the end of the play a velocity trip mechanism which is well known in the art is actuated to shift a lever within the gap of gear 25 to in effect fill its mutilation and causes gear 24 to engage gear 25. This initial engagement is the start of the record change cycle during which gear 24 rotates in a clockwise direction driving main gear 25 in a counter-clockwise direction but for only one revolution.

The mechanism for moving the tone arm includes a drive link 26 having an elongated slot 27 at one extremity which receives a pin 28 eccentrically disposed on the under side of gear 25. A biasing spring 30 causes the pin normally to abut one end of slot 27 as shown. The opposite end of link 26 is provided with an upward protruding pin 31 which engages one end of an arm 32 that is supported for rotation about hollow tone arm shaft 19. The other end of arm 32 includes a projecting tab 33 which is engageable with a tone arm locating member 57. Pin 31 is also positioned between the legs 35 and 36 of an essentially horse-shoe shaped member 37 which is fixed at its bight end to shaft 19. Movement of link 26 in the direction shown by the arrow moves pin 31 against leg 36 to cause counter-clockwise rotation of shaft 19 and tone arm 21; movement of link 26 in the opposite direction moves pin 31 against leg 35 to cause clockwise rotation. Suitable means (not shown) are provided for braking rotational movement of shaft 19 during a record change cycle to maintain adequate control of the tone arm movement.

While rotation of tone arm 21 may be effected by displacement of link 26, it is also necessary that the arm be lifted and lowered at the start and completion of the record change cycle. To that end there is provided a tone arm lifting lever 40 which is pivoted on a stud 41 from base 11. A spring 42 biases lever 40 in a counter-clockwise direction. One end 43 of lever 40 engages pin 28 and provides a detent position for gear 25. An opposite end 44 of lever 40 includes a cam surface 45 which is adapted to engage a lifting pin 46 which is concentric with tone arm shaft 19. Upward movement of lifting pin 46 raises the tone arm and downward movement lowers it; thus, counter-clockwise movement of lever 40 pushes lifting pin 46 upward raising the tone arm and thereafter clockwise movement of lever 40 lowers the tone arm.

The record changer further includes means for releasing records onto turntable 13 from a stack on spindle 18. This type of mechanism is old in the art and will not be discussed.

In accordance with the invention a sensing arm 22 is mounted for rotational displacement about a predetermined axis which is the axis of sensing arm shaft 23. Sensing arm 22 is shown in its reference position and is movable during a record change cycle from its reference position to engage the periphery of a record to be played by the record changer as shown by the dashed outlines of sensing arm 22 in both FIGURES 1 and 2. A tone arm locating member 57 is rotatably mounted on shaft 23 and is located in the plane of movement of the projecting tab 33 on arm 32 so as to be contacted by the tab. Locating member 57 includes a series of stop abutments "off," 7, 10, and 12 angularly spaced about the center of shaft 23. Abutments 7, 10, and 12 correspond to the different record sizes which the record changer is to accommodate, e.g., for playing 7 inch, 10 inch, and 12 inch records. The "off" stop abutment provides for automatic shut-off after the last record has been played and will be discussed later.

Each stop abutment is arcuate in profile and concentric with the axis of shaft 23 but spaced a different radial distance from the axis, the spacing distance of stop abutment 7 corresponding to the smallest size record and that of stop abutment 12 corresponding to the largest size record. A stop abutment is placed in its operating position when it is rotated into the plane of movement of projecting tab 33 of arm 32. For example, in FIGURE 2 stop abutment 12 is in its operating position.

Figure 3:
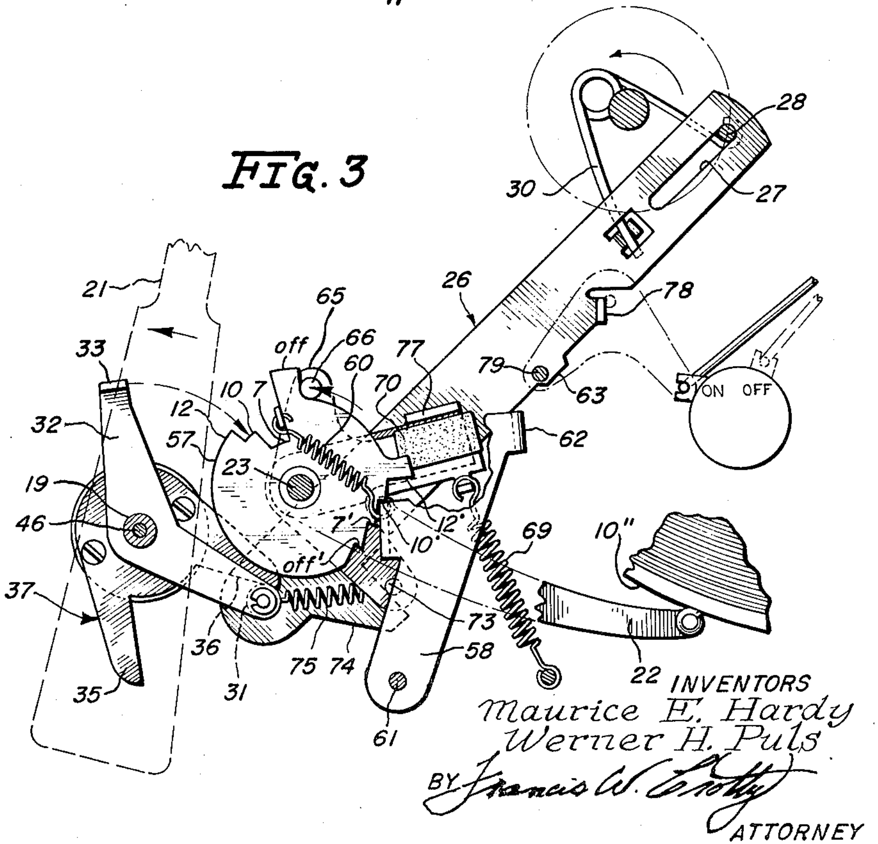
FIGURE 3 is a plan view of part of the structure of FIGURE 2.

Releasable locking means are also provided for retaining a selected stop abutment in its operating position. More particularly, locating member 57 includes in addition to stop abutments 7, 10, 12 and "off" ratchet teeth 7′, 10′, 12′ and "off′." The teeth are engageable by a pawl 58 which is pivoted on a pin 61 from base 11 as best shown in FIGURE 3. Pawl 58 is biased in a counter-clockwise direction by a spring 60 which is connected between the pawl and locating member 57. The same spring biases the locating member in a clockwise direction. Ratchet teeth 7′, 10′, 12′ and "off′" are spaced on the edge of member 57 to retain a selected stop abutment in its operating position when the correspondingly designated ratchet tooth is engaged by pawl 58. Thus, in FIGURE 2 the pawl is engaging tooth 12′ retaining stop abutment 12 in the path of movement of tab 33; similarly in FIGURE 3, pawl 58 is engaging tooth 10′ retaining stop abutment 10 in the path of movement of tab 33.

The limit of clockwise rotation of locating member 57 is where pawl 58 engages tooth 12′. This is the home position of the member shown in FIGURE 2 to which the mechanism is reset in a change cycle. For that purpose there are means, operable by the record changing mechanism, to release the locking means and restore tone arm locating member to its home position at the start of the record change cycle. This reset means includes a lower portion 62 of pawl 58 which is engageable by a camming surface 63 protruding from the edge of link 26. At the start of the change cycle cam 63 moves toward portion 62 rotating pawl 58 clockwise out of engagement with teeth 7′, 10′ or "off′" to allow member 57 to rotate to its home position.

A uni-directional mechanical coupling is disposed between locating member 57 and sensing arm 22. It comprises a bell crank 64 mounted on shaft 23 and having one end 65 with an upward projecting stud 66 a portion of which has a common plane of movement with an edge of the "off" stop abutment. The other end 68 of bell crank 64 is connected to a spring 69 fastened to base 11 which biases the crank in a clockwise direction. When sensing arm 22 is moved to engage the periphery of a record, bell crank 64 rotates in a counter-clockwise direction moving stud 66 into engagement with the "off" stop abutment to rotate member 57 counter-clockwise. However, because of the uni-directional coupling, clockwise movement of sensing arm 22 has no effect on member 57.

Uni-directional coupling means are also provided for driving sensing arm 22 from the record changing mechanism, including a magnet 70 which is secured to the end 68 of bell crank 64. A second bell crank 71 is mounted for rotation on shaft 23 and includes one end having an upward extending tab 77 of magnetic material which is attractable by magnet 70 to magnetically couple bell cranks 64 and 71.

Figure 4:
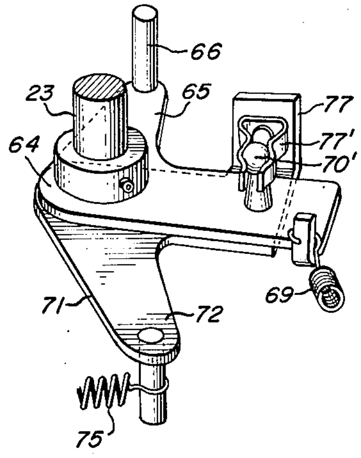
FIGURE 4 shows an alternative embodiment of part of the tone arm positioning assembly of FIGURE 2.

An alternative device for coupling the bell cranks is shown in FIGURE 4. The magnetic coupling is replaced by a ball and socket joint comprising a ball 70′ which is mounted on end 68 of bell crank 64 and engageable with a flexible socket 77′ which is mounted on upwardly extending tab 77.

The other end 72 of bell crank 71 has a downward extending stud 73 which is biased against an abutment 74 extending from link 26 by a spring 75 connected between stud 73 and pin 31. Movement of link 26 in the direction of the arrow rotates bell crank 71 counter-clockwise; movement of the lever in the opposite direction rotates crank 71 clockwise.

*Operation*

In explaining the operation of the tone arm positioning assembly which is the subject of this invention, it will be described in the context of the record change cycle. Assume initially that the record changer mechanism is in the condition as shown in FIGURE 2 and that tone arm 21 is approaching fast-finishing grooves of the record which is being played. Further assume that there is a 10 inch record stacked on spindle 18 and it is the next record to be played.

As the tone arm is swung toward center spindle 18 by the fast-finishing grooves, a velocity trip mechanism is actuated to engage gear 24 with single-revolution gear 25. At this point the record change cycle has started. As gear 25 rotates, link 26 is pulled by pin 28 in the direction as shown by the arrow moving camming surface 63 into engagement with pawl 58 to restore the tone arm locating member 57 to its home position if it is not already in this position. Movement of link 26 also moves pin 31 toward leg 36 of member 37. As this occurs, and before pin 31 engages leg 36, tone arm lifting lever 40 is released from pin 28 to cam lifting pin 46 upwardly under the influence of spring 42 and to raise the tone arm from the record. After the tone arm has been raised, pin 31 engages leg 36 to move the tone arm outwardly from spindle 18 past the edge of the turntable. At the same time, sensing arm 22 is moved from its reference position to engage the periphery of the 10-inch record which is on the spindle to be played. This is accomplished by the rotation of bell crank 71 by link 26. Sensing arm 22 follows tthe counter-clockwise motion of crank 71 since they are magnetically coupled. As sensing arm 22 is moving toward the periphery of the 10 inch record, projecting stud 66 of bell crank 64 engages locating member 57 and rotates stop abutment 10 into its operating position. The simultaneous motion about the axis of shaft 23 of bell cranks 64 and 71 and locating member 57 continues until sensing arm 22 engages the periphery of the 10 inch record, placing abutment 10 in its operating position as shown in FIGURE 3. At this point movement of sensing arm 22 and bell crank 64 is arrested by this engagement. However, gear 25 continues to rotate, forcing bell crank 71 to continue in its counter-clockwise path and thus the coupling between sensing arm 22 and the record changing mechanism is overcome; sensing arm 22 is immediately pulled back to its reference position by biasing spring 69. But stop abutment 10 of locating member 57 is retained in its operating position by pawl 58 engaging ratchet tooth 10'.

As gear 25 continues to rotate, it moves link 26 on a return stroke in the opposite direction to that shown by the arrow and thus moves pin 31 of the linkage towards engagement with leg 35. Before leg 35 is engaged, however, a release mechanism (not shown) which is connected to gear 25 drops the 10 inch record onto turntable 13. After the record has been dropped, pin 31 engages leg 35 to move tone arm 21 inwardly over the turntable. Since the two ends of link 26 are mounted on pins 28 and 31 which in turn are mounted for rotation about respective centers, link 26 also has a path of movement which is normal to that shown by the arrow. Thus, on the return stroke of link 26 cam 63 clears pawl 62 and locating member 57 is thereby retained in its operating position.

In accordance with the objectives of the invention, tone arm 21 is positioned over the commencement grooves of the 10 inch record when projecting tab 33 of arm 32 engages stop abutment 10 of tone arm locating member 57. This engagement prevents any further movement of pin 31 and link 26. However, continued rotation of gear 25 is possible because of the lost motion provided by spring 30 and slot 27. Further rotation of gear 25 causes tone arm lifting lever 40 to be rotated clockwise due to the engagement of pin 28 with this lever as required to lower the tone arm on the commencement groove of the record. The record change cycle is now complete.

After the play of the last record on the stack, the record changer shuts itself off automatically. This operation occurs in the following manner: As the tone arm is swung over by the fast-finishing grooves of the record, the velocity trip mechanism causes gear 25 to be engaged by gear 24 and the tone arm is moved outwardly over the record as explained above. Sensing arm 22 moves toward spindle 18 and since its movement is not arrested by a record on the spindle it moves to the automatic shut-off position as shown in the dashed outline in FIGURE 2. The "off" abutment of locating member 57 is thus placed in its operating position where it is retained by pawl 58 throughout the remainder of the "off cycle." As tone arm 21 attempts to swing inwardly, projecting tab 33 of arm 32 is immediately engaged by the "off" abutment retaining tone arm 21 in its "set down" position as shown in FIGURE 1. This limits the movement of link 26 in a direction opposite to that of the arrow to the largest extent of any stop abutment since the "off" abutment extends farthest from shaft 23. The limitation of reverse movement of link 26 causes an upward protruding tab 78 from link 26 to have a path of movement which intersects an arm 79 of a shut-off mechanism (see FIGURE 3). Engagement of tab 78 with the arm de-energizes the record changer. In an ordinary record change cycle no engagement occurs since abutments 7, 10 and 12 allow a greater amount of reverse movement of link 26 thus shifting the path of movement of tab 78 away from arm 79.

Thus, the invention provides an improved automatic record changer having a tone arm positioning assembly which is efficient and reliable in operation but yet employs a minimum number of parts to make it relatively inexpensive.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A tone arm positioning assembly for an automatic record changer having a record changing mechanism for effectuating a record change cycle comprising: a sensing arm having a reference position and movable during a record-change cycle from such position to engage the periphery of a record to be played by said record changer; a tone arm locating member movable with said sensing arm; and means for driving said sensing arm from said record changing mechanism including a coupling device establishing a releasable driving connection between said sensing arm and said record changing mechanism which is interrupted when movement of said sensing arm is arrested by engagement of said arm with said record during said record change cycle.

2. A tone arm positioning assembly for an automatic record changer having a record changing mechanism for effectuating a record change cycle comprising: a sensing arm having a reference position and movable during a record-change cycle from such position to engage the periphery of a record to be played by said record changer; a tone arm locating member movable with said sensing arm; a uni-directional mechanical coupling between said locating member and said sensing arm to move such member only on a sensing movement of such arm; and means for driving said sensing arm from said record changing mechanism including a coupling device for establishing a releasable driving connection between said sensing arm and said record changing mechanism which is interrupted when movement of said sensing arm is arrested by engagement of said arm with said record during said record change cycle.

3. A tone arm positioning assembly for an automatic record changer having a record changing mechanism for effectuating a record change cycle comprising: a sensing arm having a reference position and movable during a record-change cycle from such position to engage the periphery of a record to be played by said record changer; a tone arm locating member having a series of stop abutments, having a home position and rotationally displaceable from said some position with movement of said sensing arm to position a selected one of said stop abutments in an operating position; and means for driving said sensing arm from said record changing mechanism including a magnetic coupling device establishing a releasable driving connection between said sensing arm and said record changing mechanism which is interrupted when movement of said sensing arm is arrested by engagement of said arm with said record during said record change cycle.

4. A tone arm positioning assembly for an automatic record changer having a record changing mechanism for effectuating a record change cycle comprising: a sensing arm, having a reference position and movable during a record change cycle from such position to engage the periphery of a record to be played by said record changer; a tone arm locating member having a series of stop abutments, having a home position and rotationally displaceable from said home position with movement of said sensing arm to position a selected one of said stop abutments in an operating position; means for biasing said tone arm locating member to its home position; releasable locking means for retaining said selected stop abutment in its operating position; means operable by said record changing mechanism to release said locking means and restore said tone arm locating member to its home position at a predetermined moment in said record change cycle; and means for driving said sensing arm from said record changing mechanism including a coupling device establishing a releasable driving connection between said sensing arm and said record changing mechanism which is interrupted when movement of said sensing arm is arrested by engagement of said arm with said record during said record change cycle.

5. A tone arm positioning assembly for an automatic record changer having a record changing mechanism for effectuating a record change cycle comprising: a sensing arm, mounted for rotational displacement about a predetermined axis, having a reference position and movable during a record change cycle from such position to engage the periphery of a record to be played by said record changer; a tone arm locating member having a series of stop abutments, having a home position and rotationally displaceable about said axis from said home position with movement of said sensing arm to position a selected one of said stop abutments in an operating position; means for biasing said tone arm locating member to its home position; releasable locking means for retaining said selected stop abutment in its operating position; means operable by said record changing mechanism to release said locking means and restore said tone arm locating member to its home position during a record change cycle; and means for driving said sensing arm from said record changing mechanism including a member rotatable about said axis and a magnet secured to said member for establishing a magnetic coupling between said sensing arm and said record changing mechanism which is overcome to release the connection therebetween when movement of said sensing arm is arrested by engagement of said arm with said record during said record change cycle.

6. A tone arm positioning assembly for an automatic record changer having a record changing mechanism for effectuating a record change cycle comprising: a sensing arm, mounted for rotational displacement about a predetermined axis, having a reference position and movable during a record change cycle from such position to engage the periphery of a record to be played by said record changer; a tone arm locating member having a series of stop abutments, having a home position and rotationally displaceable about said axis from said home position with movement of said sensing arm to position a selected one of said stop abutments in an operating position; a uni-directional mechanical coupling between said locating member and said sensing arm to move such member only on a sensing movement of such arm; means for biasing said tone arm locating member to its home position; releasable locking means for retaining said selected stop abutment in its operating position; means operable by said record changing mechanism to release said locking means and restore said tone arm locating member to its home position at the start of said record change cycle; and means for driving said sensing arm from said record changing mechanism including a member rotatable about said axis and a magnet secured to said member for establishing a magnetic coupling between said sensing arm and said record changing mechanism which is overcome to release the connection therebetween when movement of said sensing arm is arrested by engagement of said arm with said record during a record change cycle.

No references cited.